US008010257B2

(12) United States Patent
Shidai et al.

(10) Patent No.: US 8,010,257 B2
(45) Date of Patent: Aug. 30, 2011

(54) ELECTRONIC CONTROL UNITS FOR CONTROLLING IN-VEHICLE DEVICES USING TIME-DEPENDENT DATA AND VEHICLE CONTROL SYSTEM INTEGRATING SUCH UNITS FOR REAL-TIME DISTRIBUTED CONTROL

(75) Inventors: Takahiro Shidai, Oobu (JP); Seiji Miyamoto, Kariya (JP); Waka Noda, Oobu (JP); Ryo Ito, Toyota (JP); Hiroyuki Hirano, Toyota (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 1142 days.

(21) Appl. No.: 11/717,179

(22) Filed: Mar. 13, 2007

(65) Prior Publication Data
US 2007/0213888 A1  Sep. 13, 2007

(30) Foreign Application Priority Data
Mar. 13, 2006  (JP) .................................. 2006-067202

(51) Int. Cl.
*G06F 11/30* (2006.01)
(52) U.S. Cl. ........................................................ 701/48
(58) Field of Classification Search ................ 701/1, 33, 701/36, 48, 66, 93; 340/438, 439
See application file for complete search history.

(56) References Cited

U.S. PATENT DOCUMENTS

| 4,497,057 A * | 1/1985 | Kato et al. ....................... 714/46 |
| 6,998,996 B1 * | 2/2006 | Eidson ........................ 340/825.2 |
| 7,424,351 B2 * | 9/2008 | Noguchi .......................... 701/35 |

| 2004/0088110 A1 | 5/2004 | Suzuki |
| 2004/0143656 A1 | 7/2004 | Okada et al. |
| 2004/0260788 A1 | 12/2004 | Miyano et al. |
| 2005/0159869 A1 | 7/2005 | Tohdo et al. |
| 2005/0159870 A1 | 7/2005 | Tohdo et al. |

FOREIGN PATENT DOCUMENTS

DE  102 18 645 A1  11/2003

(Continued)

OTHER PUBLICATIONS

Japanese Office Action dated Jul. 28, 2009, issued in corresponding Japanese Application No. 2006-067202, with English translation.

(Continued)

*Primary Examiner* — Dalena Tran
(74) *Attorney, Agent, or Firm* — Nixon & Vanderhye P.C.

(57) ABSTRACT

An electronic control unit is incorporated as one of a plurality of electronic controllers composing a system for controlling in-vehicle devices on a distributed and mutually-synchronized control manner in a vehicle. The plurality of electronic control units are communicably connected with each other via an in-vehicle network to communicate information including the time-dependent data among the electronic control units. Each electronic control unit comprises a control member, an elapsed-time calculation component, and a validity determination component. The control member performs the control on the basis of time-dependent data acquired in time series relating to the vehicle. The elapsed-time calculation component is configured to calculate an elapsed time elapsing from acquisition of the time-dependent data. The validity determination component is configured to use the calculated elapsed time to determine whether or not the time-dependent data is valid or not for the control in terms of freshness of the time-dependent data.

25 Claims, 9 Drawing Sheets

FOREIGN PATENT DOCUMENTS

| | | |
|---|---|---|
| EP | 1 712 424 A2 | 10/2006 |
| JP | 11-261611 | 9/1999 |
| JP | 2001-141508 | 5/2001 |
| JP | 2004-085286 | 3/2004 |
| JP | 2004-220326 | 8/2004 |
| JP | 2005-104453 | 4/2005 |
| JP | 2005-199954 | 7/2005 |

OTHER PUBLICATIONS

European Search Report dated Aug. 16, 2007 in Application No. 07005174.3.

* cited by examiner

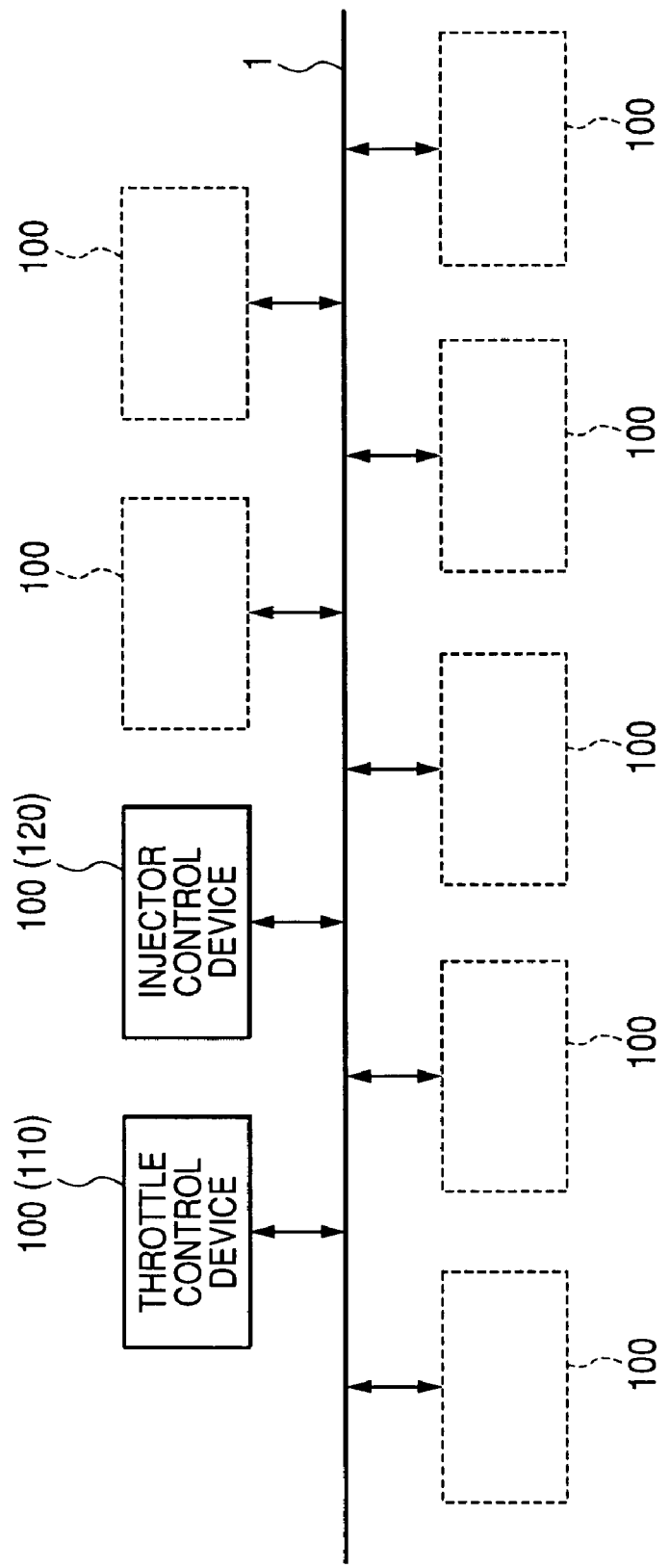

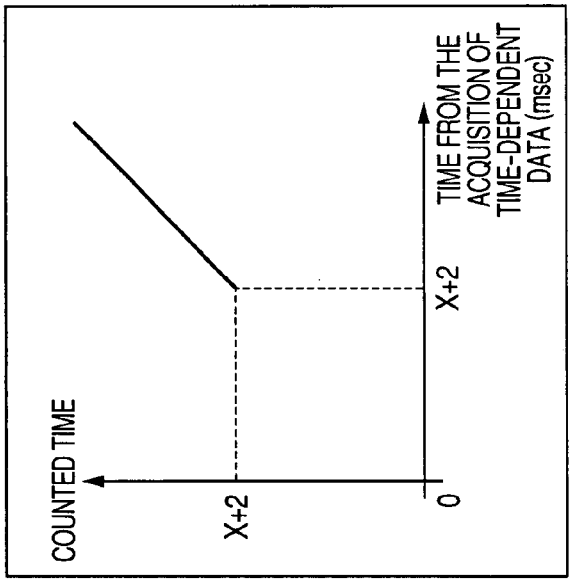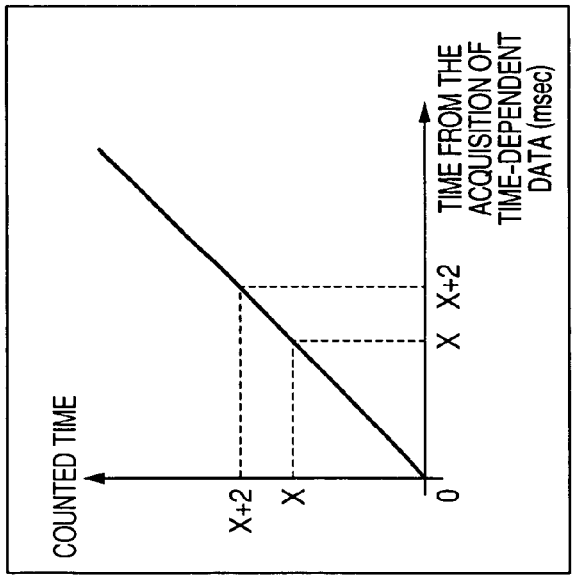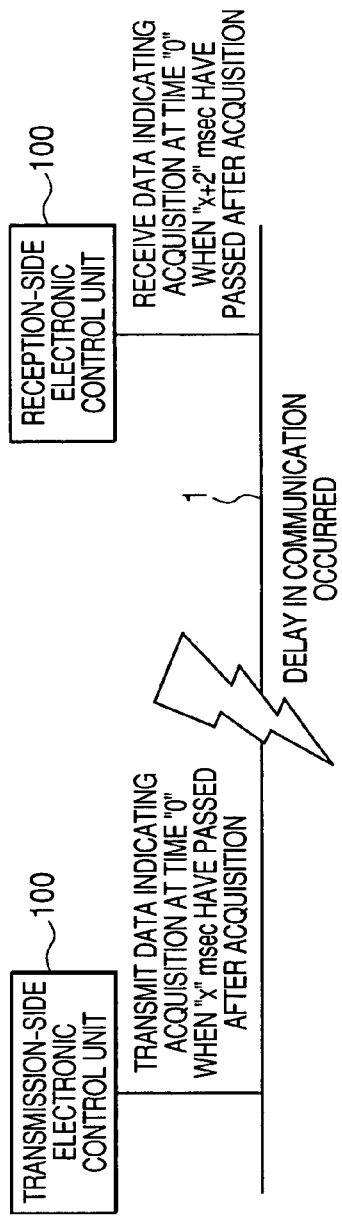

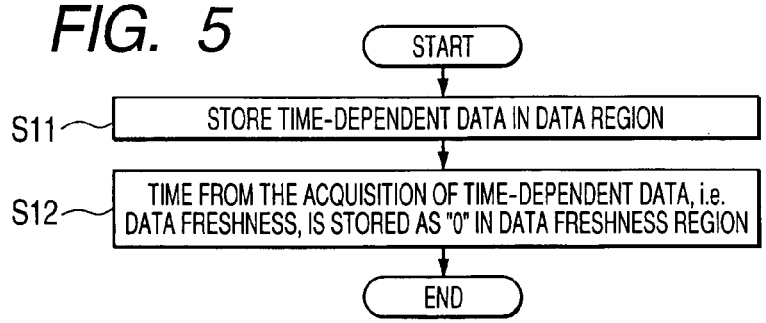
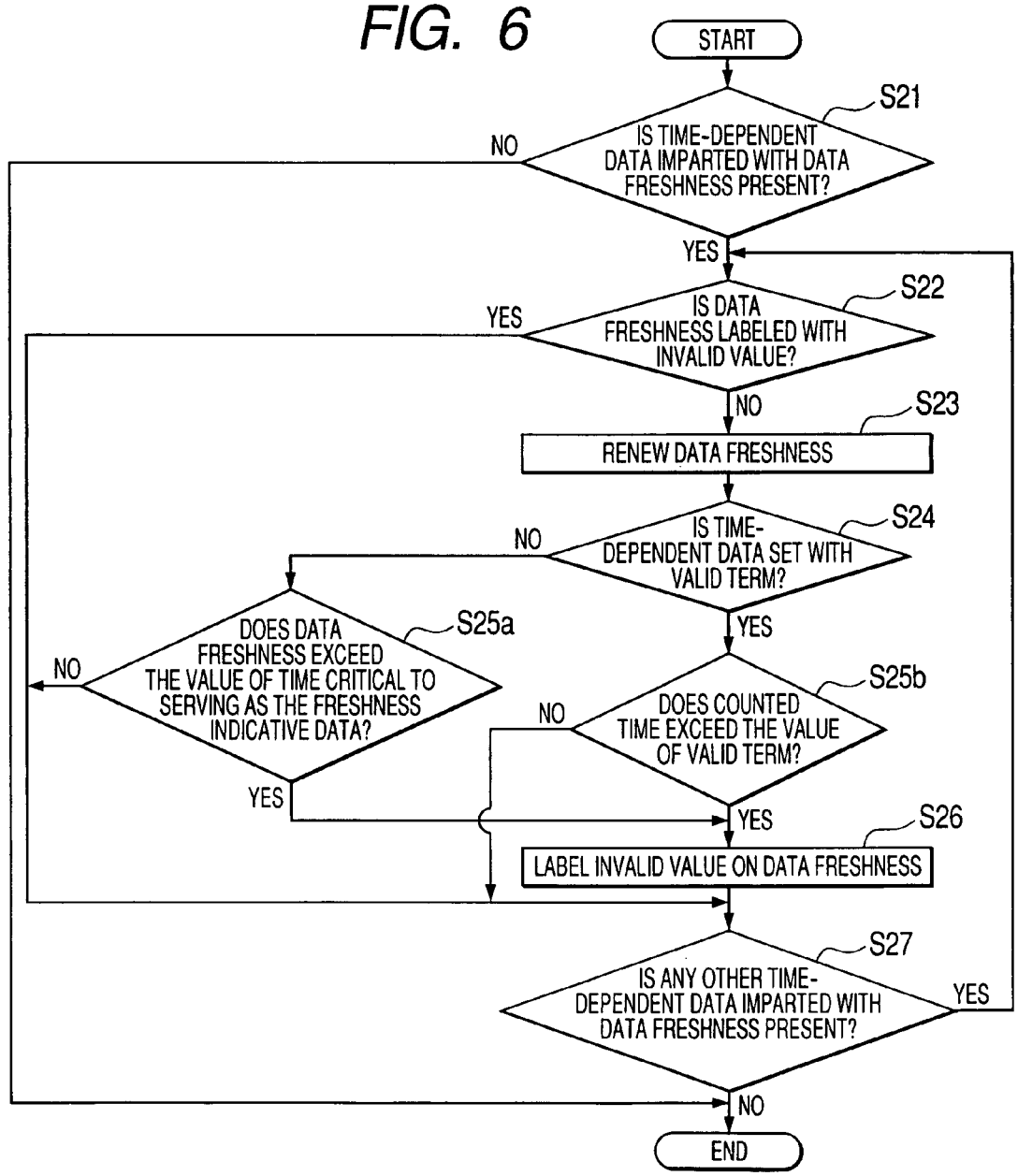

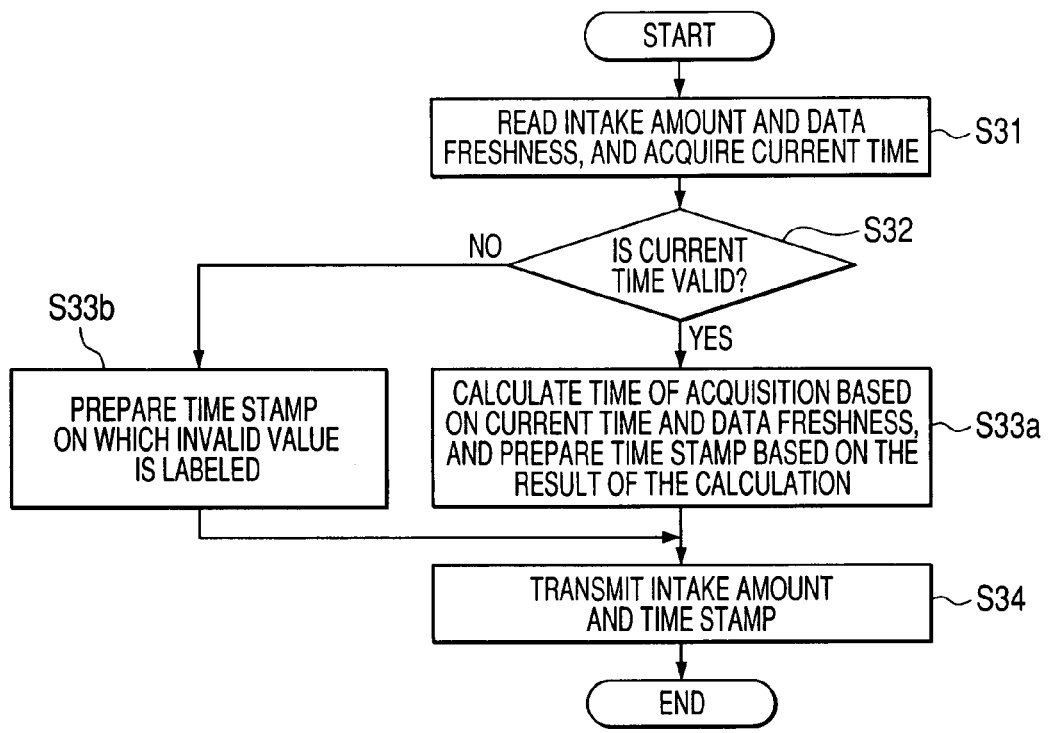
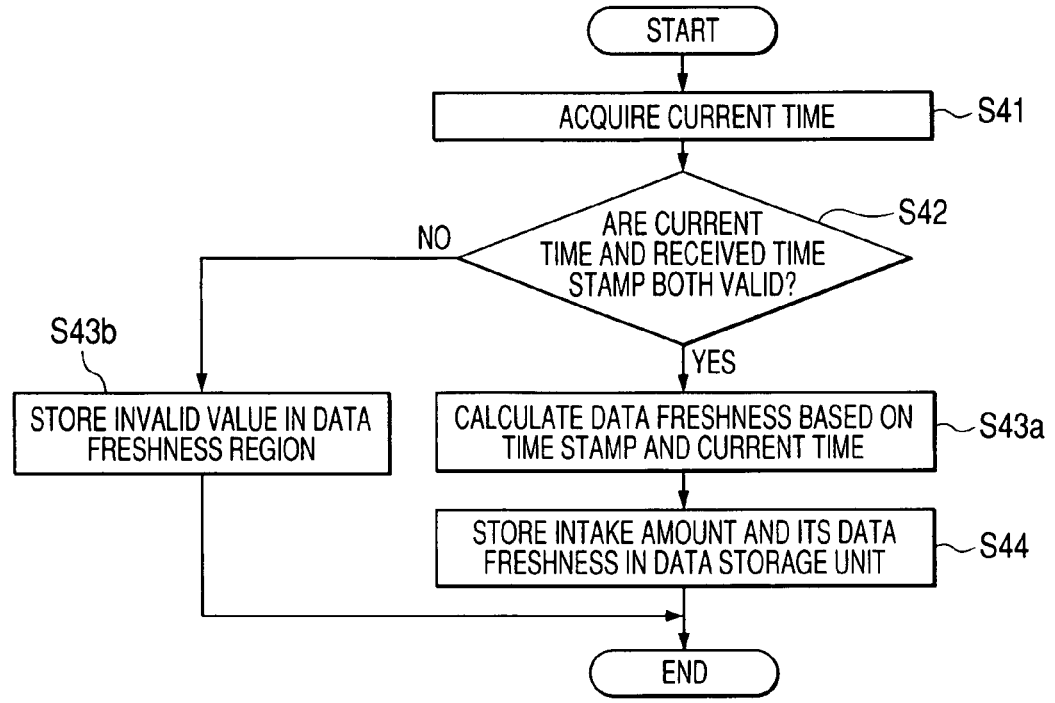

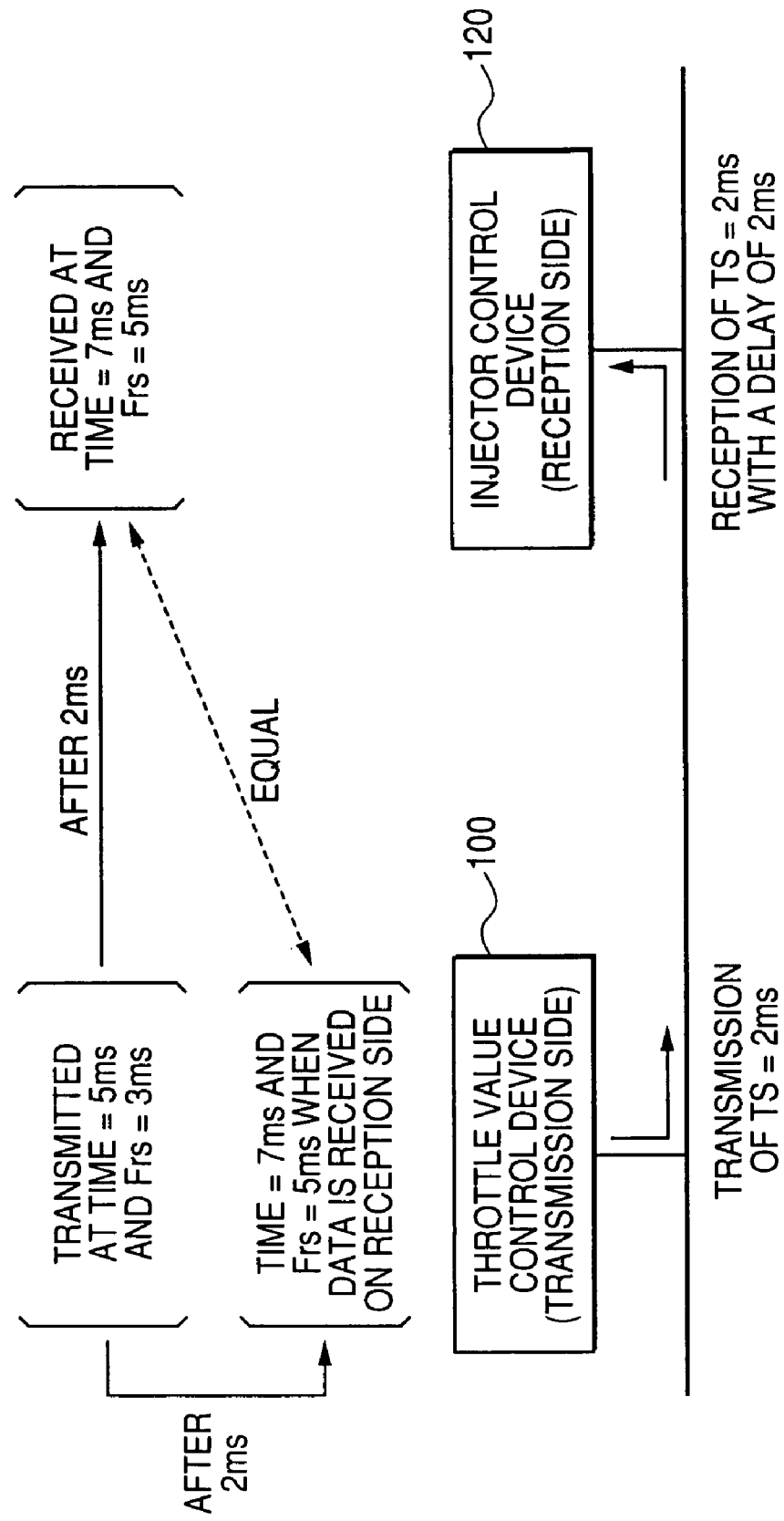

ELECTRONIC CONTROL UNITS FOR CONTROLLING IN-VEHICLE DEVICES USING TIME-DEPENDENT DATA AND VEHICLE CONTROL SYSTEM INTEGRATING SUCH UNITS FOR REAL-TIME DISTRIBUTED CONTROL

CROSS-REFERENCE TO RELATED APPLICATION

This application is based on and claims the benefit of priority from earlier Japanese Patent Application No. 2006-067202 filed Mar. 13, 2006, the description of which is incorporated herein by reference.

BACKGROUND OF THE INVENTION

1. Technical Field of the Invention

The present invention relates to a vehicle control system for performing real-time distributed control through a plurality of electronic control units on an in-vehicle network, and relates to the electronic control units used for the vehicle control system.

2. Related Art

In this type of vehicle control system, vehicle conditions, such as an amount of intake air, are monitored and converted to time-dependent data for transmission/reception between the plurality of electronic control units on an in-vehicle network. Various in-vehicle devices are thus subjected to distributed control in a synchronized manner based on such common time-dependent data. Therefore, in performing the distributed control of the in-vehicle devices under such a vehicle control system, it is important to adequately keep the freshness of the time-dependent data so as to adequately perform the distributed control.

As this type of vehicle control system, Japanese Patent Laid-Open No. 2005-199954, for example, discloses one in which the electronic control units on the in-vehicle network each administer the time (time stamp) of acquisition of the time-dependent data. Then, in performing the distributed control of the various in-vehicle devices, the freshness of the time-dependent data is evaluated by comparing the acquired time (time stamp) with the current time. Specifically, a determination is made as to the validity of the time-dependent data, and the apparatuses are adequately controlled according to the result of the determination, so that the adequacy of the distributed control can be ensured.

It is true that, in the conventional vehicle control system mentioned above, the adequacy of the distributed control is ensured through the determination process for the validity of the time-dependent data. However, depending on the operation conditions, such a conventional vehicle control system can significantly deteriorate the reliability of the determination on the validity.

The above conventional vehicle control system has been realized as a time-synchronization network system, in which the time of synchronization is typically expressed in a form of a counted value, for example, which is obtained through the periodical counting up of a counter. Such a counter resets the counted value every time the counted value has reached a maximum value. That is, this type of counter repeatedly uses numerical values within a specific numerical range in a periodical manner (e.g., every two seconds) to express the time. Thus, in case where some malfunction has occurred in the vehicle control system during which the numerical values are counted more than one round, and in case where the determination process is performed as to the validity of the over-one-round counted value, determination error can occur, or moreover, adverse effect may be caused to the real-time control mentioned above.

SUMMARY OF THE INVENTION

The present invention has been made in light of the circumstances described above, and has as its object to provide a vehicle control system and electronic control units used for the system, which reliably operate in performing distributed control of the various in-vehicle devices through a plurality of electronic devices on the in-vehicle network. In particular, the present invention has an object of providing a vehicle control system and electronic control units used for the system, which are capable of evaluating (determining) the freshness (validity) of the time-dependent data provided for the control with high reliability.

In order to achieve such an object, as one aspect of the present invention, there is provided an electronic control unit incorporated as one of a plurality of electronic controllers composing a system for controlling in-vehicle devices on a distributed and mutually-synchronized control manner in a vehicle, the plurality of electronic control units being communicably connected with each other via an in-vehicle network so as to communicate information including the time-dependent data among the electronic control units, the electronic control unit comprising: a control member performing the control on the basis of time-dependent data acquired in time series relating to the vehicle, an elapsed-time calculation component configured to calculate an elapsed time elapsing from acquisition of the time-dependent data; and a validity determination component configured to use the calculated elapsed time to determine whether or not the time-dependent data is valid or not for the control in terms of freshness of the time-dependent data.

In such a configuration, the determination on the validity of the time-dependent data is made based on an elapsed time calculated by the elapsed-time calculation component. For example, such a time is counted by the clock means. Accordingly, in case malfunction has occurred in the system, during which numerical values indicative of time of synchronization (counted value) are counted more than one round, the freshness (validity) of the time-dependent data used for the distributed control can be evaluated (determined) with higher reliability. Moreover, adequacy of the distributed control can be suitably ensured. It should be appreciated that, among the data used for the distributed control, time-dependent data refers to data of physical amount which changes with the passage of time. Such time-dependent data includes, for example, an intake amount or fuel injection amount, temperature, vehicle speed and engine speed.

In such a vehicle control system, the data indicating freshness (hereinafter referred to as "freshness indicative data") is also subjected to transmission/reception between the plurality of electronic control units together with the time-dependent data explained above. In such data communication, it is also possible to use the time counted by the clock means as the freshness indicative data and to transmit the counted time to other electronic control units on the in-vehicle network. However, simply using such counted time as data to be transmitted has a risk that delay time in communication is not reflected on the data to be transmitted (counted time) in case the delay time has been caused such as by communication loading on the in-vehicle network or loading of processes performed by the electronic control units. In this case, inconsistency could occur between the vehicle control executed by a transmission-side electronic control unit and the vehicle control executed by a reception-side electronic control unit, causing adverse effect on the adequacy of the distributed control.

Preferably, the electronic control unit comprises a production component producing, as information indicative of the freshness of the time-dependent data, data showing a time instant at which the time-dependent data is acquired, and a transmission component transmitting both the time-dependent data and the data showing the time instant of the data acquisition to another electronic control unit via the in-vehicle network.

Thus, on the occurrence of delay in communication, the delay time is reflected on the data to be transmitted, and thus the adequacy of the distributed control can be more suitably ensured.

It is practically desirable to prepare and transmit the time data in such manners as provided below:

The production component comprises means for obtaining a current time instant at which the time-dependent data is transmitted and means for calculating the data showing the time instant of the data acquisition by subtracting the calculated elapsed time from the current time instant of the transmission.

It is preferred that the control unit comprises a memory device in which the time-dependent data are memorized together with the data showing the time instant at which the time-dependent data is acquired, wherein the setting component is configured to make reference to the memory device to obtain the time instant of the data acquisition.

It is preferable that the electronic control unit comprises a memory device in which the time-dependent data are memorized together with the data showing the time instant at which the time-dependent data is acquired, wherein the setting component is configured to make reference to the memory device to obtain the time instant of the data acquisition. In this way, the reception-side electronic control unit is enabled to recognize the malfunction of the clock means incorporated in the transmission-side electronic control unit by receiving the invalid value of the time data, and to perform a suitable process according to the recognition.

It is still preferred that, in the electronic control unit, the validity determination component comprises means for determining whether or not the calculated elapsed time shows an invalidity thereof, means for determining that the time-dependent data is invalid for the control whenever it is determined that the calculated elapsed time shows the invalidity thereof, and means for setting an invalid value to the calculated elapsed time. Thus, determination on the validity can be facilitated. Thus, storage capacity that would be required for registering the invalid data can be reduced. Further, determination on the registration of the invalid data can be readily made based on the time counted by the clock means.

It is preferred that the validity determination component comprises means for recording the data showing the invalidity when the calculated elapsed time exceeds a limit time thereof which corresponds to a maximum expression of the information indicative of the freshness of the time-dependent data. Alternatively, the validity determination component comprises means for recording the data showing the invalidity when the calculated elapsed time passes over a valid term which is set guarantee the validity of the time-dependent data. Still preferably, the validity determination component includes means for determining whether or not there is set a valid term to the calculated elapsed time; means for determining whether or not the calculated elapsed time exceeds a limit time thereof which corresponds to a maximum expression of the information indicative of the freshness of the time-dependent data, when it is determined that the valid term is not set; means for recording the data showing the invalidity whenever the calculated elapsed time exceeds the limit time; means for determining whether or not the calculated elapsed time passes over the valid term, when it is determined that the valid term is set; and means for recording the data showing the invalidity whenever the calculated elapsed time passes over the valid term.

The invalid data should preferably be registered in the manners mentioned above in order to realize counting of time by software from the point of acquiring the time-dependent data.

On the other hand, it is preferred that the electronic control unit comprises a reception component receiving both the time-dependent data and the data showing the time instant of the data acquisition from another electronic control unit via the in-vehicle network; and a further elapsed-time calculation component is configured to calculate the elapsed time elapsing from acquisition of the received time-dependent data on the basis of both the data showing the time instant of the data acquisition and a current time instant at which the time-dependent data is received by the reception component, the calculated elapsed time being provided to the validity determination component.

This configuration can also reflect delay time, if it is present in communication, on data to be received, so that the adequacy of the distributed control is suitably ensured.

In this case as well, the validity determination component comprises means for determining whether or not the calculated elapsed time shows an invalidity thereof, means for determining that the time-dependent data is invalid for the control whenever it is determined that the calculated elapsed time shows the invalidity thereof, means for setting an invalid value to the calculated elapsed time. Thus, determination on the validity can be facilitated.

It is still preferred that the validity determination component comprises means for recording the data showing the invalidity when the calculated elapsed time exceeds a limit time thereof which corresponds to a maximum expression of the information indicative of the freshness of the time-dependent data.

Alternatively, the validity determination component comprises means for recording the data showing the invalidity when the calculated elapsed time passes over a valid term which is set guarantee the validity of the time-dependent data.

Still alternatively, the validity determination component includes means for determining whether or not there is set a valid term to the calculated elapsed time; means for determining whether or not the calculated elapsed time exceeds a limit time thereof which corresponds to a maximum expression of the information indicative of the freshness of the time-dependent data, when it is determined that the valid term is not set; means for recording the data showing the invalidity whenever the calculated elapsed time exceeds the limit time; means for determining whether or not the calculated elapsed time passes over the valid term, when it is determined that the valid term is set; and means for recording the data showing the invalidity whenever the calculated elapsed time passes over the valid term.

The invalid data should preferably be registered in the manners mentioned above in order to realize counting of time by software from the point of acquiring the time-dependent data.

It is preferred that the further elapsed-time calculation component comprises means for obtaining the current instant time at which the time-dependent data is received and means for calculating the elapsed time elapsing from the acquisition of the received time-dependent data by subtracting the time instant of the acquisition of the received time-dependent data from the current instant time of the reception.

Thus, the received time data can be converted to the time passed from the point when the time-dependent data has been acquired by the transmission-side electronic control unit (data freshness). Accordingly, the reception-side electronic control unit can suitably determine the validity of the received time-dependent data based on the data freshness.

Preferably, the validity determination component includes means for determining whether or not the current time instant is normal or not when the reception is carried out; means for determining whether or not the received data showing the time instant of the data acquisition shows validity thereof; and means for setting an invalid value to the calculated elapsed time if it is determined that the current time instant is not normal and/or the time instant of the data acquisition does not validity thereof.

BRIEF DESCRIPTION OF THE DRAWINGS

In the accompanying drawings:

FIG. 1 is a block diagram illustrating a time-synchronization network system in a vehicle control system, and electronic control units used in the system, according to a first embodiment of the present invention;

FIG. 3A is a graph showing counted time in an electronic control unit which transmits data indicative of freshness, relative to real elapsed time from the acquisition of time-dependent data;

FIG. 3B is a graph showing counted time in an electronic control unit which receives data indicative of freshness (freshness of data), relative to real elapsed time from the acquisition of time-dependent data;

FIG. 3C is a block diagram illustrating a state where delay has occurred in the communication between a transmission-side electronic control unit and a reception-side electronic control unit;

FIG. 5 is a flow diagram illustrating a procedure of control which is performed by a data operation unit when an amount of intake air has been newly found by an air amount measurement unit in a throttle valve control device;

FIG. 6 is a flow diagram illustrating a procedure of control for renewing data freshness stored in a data freshness region;

FIG. 7 is a flow diagram illustrating a procedure of transmission control which is performed by a data operation unit of a transmission-side electronic control unit at the time of transmitting data indicative of freshness;

FIG. 8 is a flow diagram illustrating a procedure of transmission control which is performed by a data operation unit of a reception-side electronic control unit at the time of transmitting data indicative of freshness;

FIG. 12 is an illustration explaining data transmission to be carried out based on the present invention.

DETAILED DESCRIPTION OF THE PREFERRED EMBODIMENTS

First Embodiment

Figure 2A:
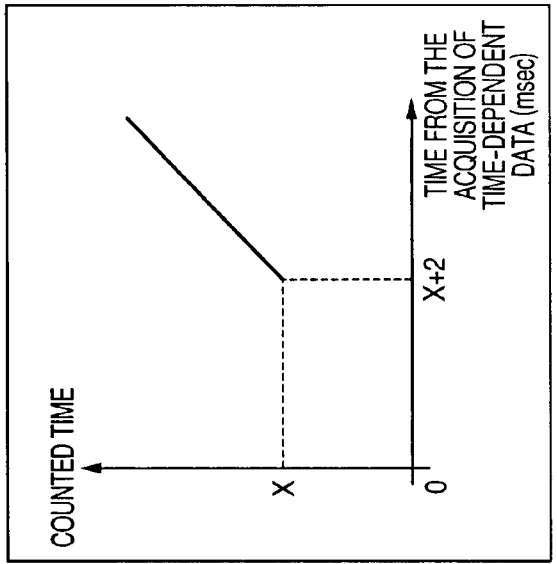
FIG. 2A is a graph showing counted time in an electronic control unit which transmits data indicative of freshness, relative to real elapsed time from the acquisition of time-dependent data.

With reference to FIGS. 1 to 8, hereinafter is described a first embodiment of a vehicle control system and electronic control units used for the system of the present invention. The vehicle control system according to the present embodiment also employs a system which utilizes the time-synchronization network system to perform the so-called real-time control through a plurality of electronic control units on an in-vehicle network.

In particular, as shown in FIG. 1, the vehicle control system according to the present invention is provided with a plurality of electronic control units 100 including a throttle valve control device 110 for controlling the degree of opening of a throttle valve while measuring an amount of air sucked by an intake system (amount of intake air) of an internal combustion engine, and an injector control device 120 for controlling an amount of fuel, for example, injected by an injector while calculating an amount of fuel to be supplied (amount of fuel supply) to a combustion chamber of the internal combustion engine.

In this vehicle control system, various types of vehicle data (time-dependent data) including an amount of intake air and an amount of fuel injection under monitoring are subjected to transmission/reception between the plurality of electronic control units 100. Various in-vehicle devices (e.g., a throttle valve and an injector) are under distributed control in a synchronized manner based on the commonly possessed time-dependent data. Further, in the vehicle control system according to the present embodiment, data indicative of freshness of such time-dependent data is also subjected transmission/reception between the plurality of electronic control units 100. In performing the distributed control, validity of the time-dependent data is determined (determining means) based on the data indicative of freshness (hereinafter referred to as "freshness indicative data"). In this way, the vehicle control system is ensured to perform adequate control based on the result of the determination.

As described above, however, in performing such a process of determination, use of the time data (time stamp) which is indicative of the time of acquiring the time-dependent data and serving as the freshness indicative data can cause an error in the subsequent determination as to the validity of the time-dependent data based on this time data, or moreover, can adversely effect the real-time control mentioned above.

Under such circumstances, the vehicle control system according to the present invention is provided with time counting means for counting time from the point of acquiring the time-dependent data. Further, an arrangement is so made that the counted time (data freshness) provided by the counting means is used as the freshness indicative data and that the validity of the time-dependent data is determined based on the counted time. In this way, in case malfunction has occurred in the system, during which numerical values indicative of time of synchronization (counted value) are counted more than one round, the freshness (validity) of the time-dependent data used for the distributed control can be evaluated (determined) with higher reliability.

On the other hand, when communication is made between the plurality of electronic devices using the counted time as the freshness indicative data, the adequacy of the distributed control may not necessarily be ensured.

Figure 2B:
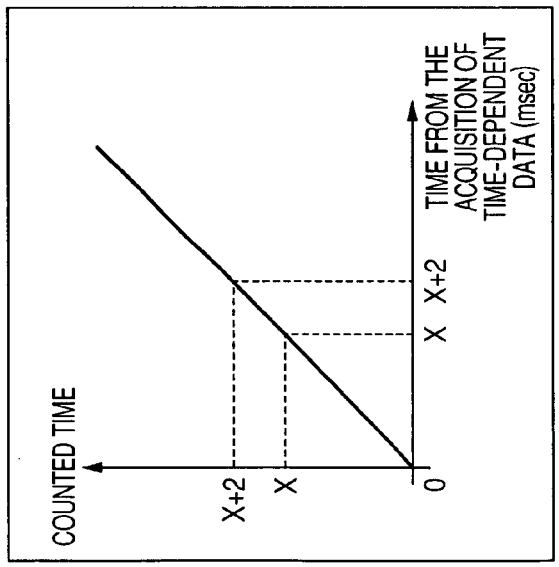
FIG. 2B is a graph showing counted time in an electronic control unit which receives data indicative of freshness (time stamp), relative to real elapsed time from the acquisition of time-dependent data.
Figure 2C:
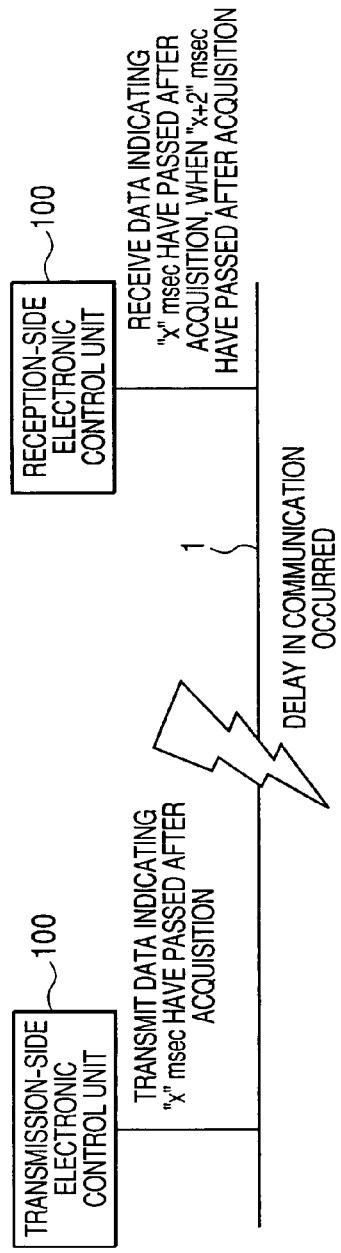
FIG. 2C is a block diagram illustrating a state where delay has occurred in the communication between a transmission-side electronic control unit and a reception-side electronic control unit.

FIG. 2A is a graph showing the counted time in the transmission-side electronic control unit 100 which transmits the freshness indicative data, relative to the real elapsed time from the point of acquiring the time-dependent data. FIG. 2B is a graph showing the counted time in the reception-side electronic control unit 100 which receives the freshness indicative data (time stamp), relative to the real elapsed time from the point of acquiring the time-dependent data. FIG. 2C is a block diagram illustrating a state where delay has occurred in the communication between the transmission-side electronic control unit 100 and the reception-side electronic control unit.

As shown in FIGS. 2A to 2C, assume that a data indicative of elapse of "x" milliseconds from the acquisition of the time-independent data has been transmitted as the freshness indicative data from the transmission-side electronic control unit 100. Assuming further that delay of "2" milliseconds has occurred in the communication, the 2 milliseconds are not reflected as deterioration in the contents of the data to be transmitted, i.e. deterioration in the freshness of the time-dependent data. This means that the reception-side electronic control unit 100 for receiving the freshness indicative data is to receive the data indicative of the lapse of only "x" milliseconds from the acquisition of the time-dependent data, at a point of time when "x+2" milliseconds have passed since the acquisition of the time-dependent data. In this way, if the distributed control of the in-vehicle devices is performed by the transmission-side electronic control unit 100 and the reception-side electronic control unit 100 based on the data described above, inconsistency may occur in the control of the apparatuses, or moreover, the adequacy of the distributed control may be adversely effected.

In this regard, the vehicle control system according to the present embodiment is so arranged that time data (time stamp) indicative of the time of acquisition of the time-dependent data is used as the freshness indicative data, and that transmission/reception of the time data is performed with other electronic control unit through an in-vehicle network 1. Thus, as shown in FIGS. 3A to 3C, even when there is delay in the communication between the electronic control units, the delay is reflected as deterioration in the freshness of the contents of the data to be transmitted, i.e. deterioration in the freshness of the time-dependent data, which may ensure adequacy in the distributed control.

Figure 4:
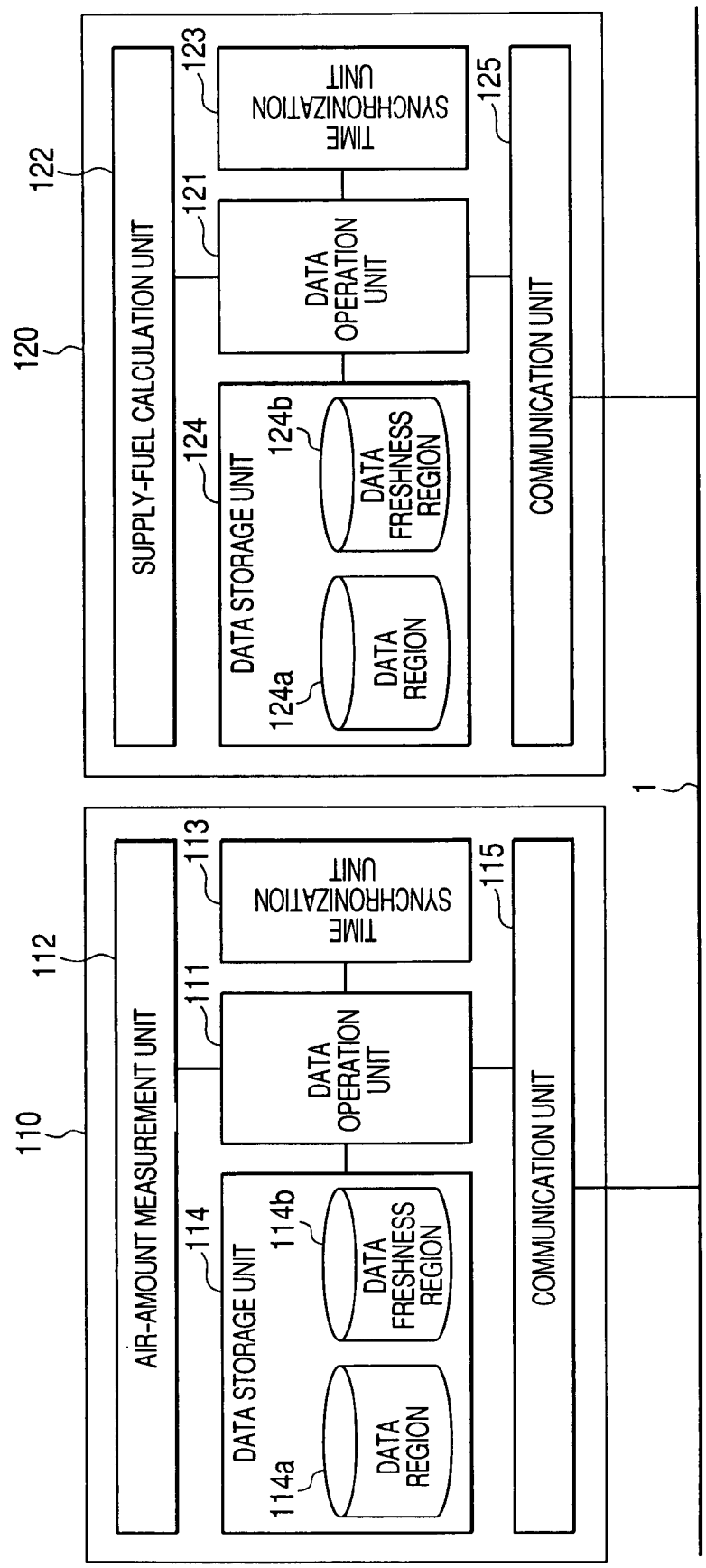
FIG. 4 is a block diagram illustrating an internal structure of a throttle valve control device and an injector control device, in particular, among the electronic control units on an in-vehicle network.

FIG. 4 is a block diagram functionally illustrating an internal structure of the throttle valve control device 110 and the injector control device 120, in particular, among the electronic control units 100 illustrated in FIG. 1. With reference to FIG. 4, hereinafter are more specifically described the inner structure and electrical operation of the control devices 110 and 120. As described above, in the present embodiment, these control devices 110 and 120 not only perform the measuring process for the amount of intake air, but also perform control of the opening degree of the throttle valve, control of the fuel injection amount or the like of the injector, and control of the various in-vehicle devices. For the sake of clarity, however, indication related to such distributed control is omitted from the figure to focus explanation on various operations associated with the freshness indicative data and administration of the freshness indicative data. Further, the throttle valve control device 110 is intended herein to serve as a transmission-side electronic control unit for transmitting the time-dependent data and the freshness indicative data for the time-independent data, and the injector control device 120 is intended herein to serve as a reception-side electronic control unit.

As shown in FIG. 4, the transmission-side throttle valve control device 110 is dominantly made up of a data operation unit 111 such as for controlling and administering the time-dependent data and the freshness indicative data for the time-dependent data which are used for the so distributed control described above. The data operation unit 111 transmits/receives these data to/from an air-amount measurement unit 112, a time synchronization unit (clock means) 113, a data storage unit 114 and a communication unit 115, for example.

The air-amount measurement unit 112 measures, for example, an amount of air sucked to an intake system (hereinafter referred to as "intake amount") of an internal combustion engine such as through an airflow sensor and demands the data operation unit 111 to register the measured intake amount at the data storage portion 114. As will be described later, the data operation unit 111 stores the time-dependent data (intake amount herein) and the freshness indicative data of the time-dependent data in the data storage unit 114 in response to such a demand for registration. The time synchronization unit 113 displays time, which is in synchronization with other electronic control units on the in-vehicle network 1, in the form of a properly counted value such as by a counter, for example. The data storage unit 114 (i.e. memory such as RAM) includes a data region 114a and a data freshness region 114b. The intake amount, i.e. the time-dependent data, is registered at the data region 114a, and data freshness, i.e. time from the point of acquiring the intake amount, is registered at the data freshness region 114b. The communication unit 115 transmits/receives the time-dependent data, such as the intake amount, and the data indicative of the time of acquisition of the time-dependent data to/from other electronic control units through the in-vehicle network 1.

On the other hand, the reception-side injector control device 120 is dominantly made up of a data operation unit 121 such as for controlling and administering the time-dependent data and the freshness indicative data for the time-dependent data which are used for the distributed control described above. The data operation unit 121 transmits/receives various data to/from a supply-fuel calculation unit 122, a time synchronization unit 123, a data storage unit 124 and a communication unit 125, for example.

The supply-fuel calculation unit 122 demands, for example, the data operation unit 121 to acquire the intake amount registered at the data storage unit 124, and calculates a supply-fuel amount appropriate for realizing a targeted air-fuel ratio taking into account a relation, for example, with the acquired intake amount. In particular, the supply-fuel amount calculated in this way is used such as for the control of fuel injection amount by the injector. The time synchronization unit 123 displays time, which is synchronization with other electronic control units on the in-vehicle network 1, in the form of a properly counted value such as by a counter, for example. The data storage unit 124 (i.e. memory such as RAM) includes a data region 124a and a data freshness region 124b. The supply-fuel amount calculated by the supply-fuel calculation unit 122 and the intake amount transmitted from the throttle valve control device 110, i.e. the time-dependent data, are registered at the data region 124a, and the data freshness is registered at the data freshness region 124b. The communication unit 125 transmits/receives the time-dependent data, such as the intake amount, and the data indicative of the time of acquisition of the time-dependent data to/from other electronic control units through the in-vehicle network 1.

FIG. 5 is a flow diagram illustrating a procedure of control performed by the data operation unit 111 in the transmission-side throttle valve control device 110 for transmitting the freshness indicative data, when there is a demand for registering the measured intake amount at the data storage unit 114.

Specifically, when the intake amount is newly measured by the air-amount measurement unit 112 and the data operation unit 111 is demanded to register the measured intake amount at the data storage unit 114, the data operation unit 111 firstly stores, as shown at step S11 of FIG. 5, the demanded intake amount (time-dependent data) in the data region 114a of the data storage unit 114. After registering the intake amount (time-dependent data) at the data storage unit 114, the data operation unit 111 then stores, at step S12, data freshness (counted time) for the intake amount at the data freshness region 114b of the data storage unit 114 in order to count time from the point of registration. In this case, the value of the data freshness is registered as "0".

FIG. 6 is a flow diagram illustrating a procedure of control for renewing the data freshness, i.e. the counted time, stored in the data freshness region 114b. This control is periodically performed by the data operation unit 111 based such as on the time displayed by the time synchronization unit 113, for example.

As shown in FIG. 6, in performing this control, a determination is made first, at step S21, as to the presence of time-dependent data in the data region 114a of the data storage unit 114, which data is registered in a manner of being imparted with the data freshness. Renewal of the data freshness is performed through the following steps S22 to S27 on condition that time-dependent data such as the intake amount is determined, at step s21, as being registered at the data region 114a.

At step S22, it is determined whether or not an invalid value is labeled on the data freshness of the time-dependent data, such as the measured intake amount. As will be described later, in the present embodiment, when the time-dependent data, or the intake amount, is determined as not having validity, the data freshness is adapted to be labeled with a predetermined invalid value as a value indicative of invalidity of the data freshness. Accordingly, when the data freshness of the time-dependent data of interest is determined, at step S22, as being labeled with the invalid value, control proceeds to step S27 (explained later) without renewing the data freshness.

On the other hand, when it is determined at step S22 that the invalid value is not labeled on (i.e., is not given to) the data freshness of interest, control proceeds to step S23. At step S23, the data freshness is renewed in a manner of counting up its value. In other words, time is counted from when the intake amount has been registered at the data storage unit 114 (or when the intake amount has been acquired). This counting is continued at intervals as long as the conditions at steps S21 and S22 are maintained. After the processing at step S23, through the following steps S24 to S26, a determination is made as to whether or not an invalid value should be labeled on the renewed data freshness, and the control based on the determination is performed.

At step S24, the time-dependent data, such as the intake amount, is determined as to whether or not a valid term has been set at the data.

When it is determined that the valid term has not been set, control proceeds to step S25a. At step S25a, it is determined whether or not a counted value of the renewed data freshness exceeds a value of time critical to serving as the freshness indicative data. If the counted value is determined as exceeding the value of the time critical to serving as the freshness indicative data, or, for example, if the counted value of the data freshness has been counted up to a maximum count value, the counted value is labeled with the predetermined invalid value indicative of invalidity of the data freshness (step S26). Then, control proceeds to step S27 (explained later). Contrarily, if it is determined, at step S25a, that the counted value does not exceed the value of the time critical to serving as the freshness indicative data, control proceeds to step S27 (explained later) without executing the process of step S26.

On the other hand, when the time-dependent data, such as the intake amount, is determined as being set with the valid term, at step S24, control proceeds to step S25b. At step S25b, a determination is made as to whether or not the counted value of the data freshness stored in the data freshness region 114b exceeds a value of the valid term of the data freshness. It should be appreciated that the valid term of the data freshness is set at a value smaller than the value of the time critical to its serving as the freshness indicative data. If the counted value is determined as exceeding the value of the valid term, the predetermined invalid value indicative of invalidity is labeled on the counted value of the data freshness (step S26). Control then proceeds to step S27 (explained later). Contrarily, if it is determined, at step S25b, that the counted value does not exceed the value of the valid term, control proceeds to step S27 so (explained later) without executing the process of step S26.

At step S27, it is determined whether or not other time-dependent data imparted with data freshness is registered at the data region 114a than the time-dependent data of interest, such as the intake amount. As long as such other data is registered at the data region 114a of the data storage unit 114, steps S22 to S27 described above are repeatedly performed for the data freshness of the time-dependent data.

As described above, the distributed control is performed in a synchronized manner by counting time from the point of acquiring the time-dependent data. To this end, determination on the validity can be made based on the counted time (data freshness). In other words, even when some malfunction has occurred in the vehicle control system, during which numerical values indicative of time of synchronization (counted value) are counted more than one round, the freshness (validity) of the time-dependent data used for the distributed control can be evaluated (determined) with higher reliability based on the counted time (data freshness).

FIG. 7 is a flow diagram illustrating a procedure of communication control performed by the data operation unit (communication control means) 111 when the intake amount, or the time-dependent data, and the freshness indicative data of the time-dependent data are transmitted from the transmission-side throttle valve control device 110 to the reception-side injector control device 120. With reference to FIG. 7, hereinafter is described the procedure of the communication control. It should be appreciated that this procedure is performed for a predetermined period of time, for example.

At step S31, the intake amount and the data freshness of the intake amount which are subjected to the communication are read out from the data region 114a and the data freshness region 114*b* of the data storage unit 114, respectively. At the same time, current time is obtained from the time synchronization unit 113. Then, at step S32, the current time displayed by the time synchronization unit 113 is determined as to its correctness. This process is executed, for example, as a process for determining whether or not the time being displayed by the time synchronization unit 113 is renewed within a predetermined period of time. When the current time displayed by the time synchronization unit 113 is determined to be correct, control proceeds to step S33*a*, where time data (time stamp) is prepared for indicating the time of acquisition of the intake amount. In the present embodiment, the data freshness stored in the data freshness region 114*b*, namely the time passed from the point of acquiring the intake amount, is subtracted from the current time to obtain the time of acquisition of the intake amount. The time data subjected to communication is prepared based on thus calculated time of acquisition of the intake amount. The time data prepared in this way is transmitted, at step S34, together with the intake amount to the reception-side injector control device 120 through the communication unit 115.

A more concrete explanation can be provided as follows. When the data freshness is expressed by Frs, the time data (i.e., time stamp) is expressed by TS, and the cyclically counted current time is expressed by Time, relationships of $$TS = Time - Frs \quad (1)$$

$$Frs = Time - TS \quad (2)$$

are established, where the data freshness Frs represents an interval of time (time to be counted) elapsing from data acquisition and the time data (time stamp) TS represents an instant time at which data is acquired. The formula (1) is used in transmitting time-dependent data and the other formula (2) is used in receiving the time-dependent data.

An example is like this. If assuming that the time data (time stamp) TS of 2 ms is transmitted at Time of 5 ms and Frs of 3 ms, as illustrated in FIG. 12. Thus, data showing time data of 2 ms is prepared by the processing at step S33*a*, and then transmitted by the processing at step S34.

However, in the process at step S32, the current time displayed by the time synchronization unit 113 may be determined as being incorrect. In this case, at step S33*b*, a predetermined invalid value is labeled on the time of acquisition of the intake amount so as to indicate invalidity of the time, and then the time data (time stamp) for communication is prepared based on the invalidity-labeled time of acquisition. The time data prepared In this way, together with the intake amount, is then transmitted to the reception-side injector control device 120 through the communication unit 115 (step S34).

FIG. 8 is a flow diagram illustrating a procedure of communication control performed by the data operation unit (communication means) 121 of the reception-side injector control device 120 when the intake amount and the time data (time stamp) transmitted as described above are received by the injector control device 120. With reference to FIG. 8, the procedure for the communication control is described below.

At step S41, current time is obtained from the time synchronization unit 123. Then, at step S42, it is determined as to whether or not the time indicated by the received time data (time stamp) is labeled with an invalid value. At the same time, the current time displayed by the reception-side time synchronization unit 123 is also determined as to its correctness. Similar to the procedure of FIG. 7, this process is executed, for example, as a process for determining whether or not the time displayed by the time synchronization unit 123 is renewed within a predetermined period of time. When the time indicated by the time data is determined as not being labeled with an invalid value and when the current time displayed by the time synchronization unit 113 is correct, control proceeds to step S43*a*. At step S43*a*, a process is performed for calculating time from when the intake amount has been stored (acquired) in the transmission-side storage unit 114 (data freshness). In the present embodiment, the data freshness is obtained by subtracting the acquisition time of the intake amount indicated by the time stamp, or the time data, from the current time (subtracted value).

In relation to the foregoing example in the transmission, an example can be provided as follows. When it is assumed that a delay of 2 ms occurs during the communication transmitted at step S34, that is, the transmitted data is received after a time period of 2 ms has passed since the transmission, the time factors can be obtained such that the current time Time is 7 ms and the time data (time stamp) TS is 2 ms. Thus, according to the foregoing formula (2), the data freshness Frs becomes 5 ms. At the time instant when the reception-side injector control device 120 receives the data, the transmission-side throttle valve control device 110 has the current time Time of 7 (=5+2) ms and the data freshness of 5 (=3+2) ms. Thus, as illustrated in FIG. 12, values of the data freshness Frs on both the transmission and reception sides at the time instant when the data is received by the control device 120 become equal to each other, when there occurs a delay of 2 ms in the communication. This means that the synchronization at to the data freshness is achieved on both transmission and reception sides at each current time.

Then, at step S44, the received intake amount is stored in the data region 124*a* of the data storage unit 124, and the calculated data freshness is stored in the data freshness region 124*b* of the data storage unit 124. Specifically, in the reception-side control device 120, the distributed control is performed by setting such an appropriate counted value, or the data freshness, at the reception-side data region 124*a*. In performing the distributed control, the received time-dependent data (intake amount) can be appropriately determined as to its validity based on the data freshness. It should be appreciated that the data freshness stored in the reception-side data freshness region 124*b* is also periodically renewed by the data operation unit 121, for example, based on the procedure of the renewal control of the data freshness illustrated in FIG. 6.

However, in the process at step S42, the time indicated by the received time data (time stamp) may be determined as being labeled with the invalid value, or the current time displayed by the time synchronization unit 123 may be determined as being incorrect. In this case, this control is terminated, at step S43*b*, at the point when an invalid value indicative of invalidity is stored in the data freshness region 124*b* where time that has passed since the acquisition of the intake amount (data freshness) is stored.

As described above, the vehicle control system and electronic control units used for the system according to the present embodiment can achieve various beneficial effects as follows.

(1) In the electronic control unit 100, the time from the point of acquiring the time-dependent data is counted, and the validity of the time-dependent data is determined based on the counted time (data freshness). Accordingly, the freshness of data (validity) of the time-dependent data used for the distributed control can be evaluated (determined) with higher reliability, and thus the adequacy of the distributed control can be ensured.

(2) In the transmission-side electronic control unit 100, the time data (time stamp) indicative of the time of acquisition of the time-dependent data is adapted to be used as the freshness indicative data, and to be transmitted to other electronic control units through the in-vehicle network 1. Accordingly, when delay is caused in the communication, the delay time is reflected on the data to be transmitted, so that the adequacy in the distributed control can be ensured.

(3) In transmitting the time data, the time of acquisition of time-dependent data is calculated by subtracting the counted time (data freshness) from the transmission time of the time data (subtracted data). This way of preparing the acquired time can eliminate the necessity of storing/retaining the time data, so that efficient utilization of the storage capacity of the system can be achieved.

(4) In the transmission-side electronic control unit 100, the time of synchronization (current time) is determined as to its correctness when the time data is transmitted, and that, if the time is incorrect, the time indicated by the time data is labeled with an invalid data. Accordingly, the reception-side electronic control unit 100 can recognize that the time of synchronization (current time) is incorrect in the transmission-side electronic control unit 100 from the fact that the time indicated by the time data is labeled with the invalid value. Thus, the reception-side electronic control unit 100 is able to execute a suitable process (e.g., process of step S43b) according to the recognition.

(5) The electronic control unit 100 is adapted to make a determination on the validity of the time-dependent data based on the determination as to whether or not the invalid value is labeled on the counted value of the data freshness. Thus, the determination on the validity can be facilitated.

(6) When the counted value of the data freshness exceeds the value of the time critical to serving as the freshness indicative data, the counted value is ensured to be labeled with an invalid value. Thus, the time from the point of acquiring the time-dependent data can be accurately counted with the aid of software.

(7) In the reception-side electronic control unit 100, the time from the point of acquiring the time-dependent data by the transmission-side electronic control unit 100 (data freshness) is calculated by subtracting the time indicated by the received time data (time stamp) from the reception time of the time data, and the data freshness is periodically renewed by the calculation. Thus, determination on the validity of the received time-dependent data can also be suitably made by the reception-side electronic control unit 100, based on the data freshness.

(8) When receiving the time data (time stamp), the reception-side electronic control unit 100 makes a determination as to the correctness of the time of synchronization. If the time of synchronization is determined as being incorrect, the data freshness stored in the data freshness region 124b is registered, being labeled with the invalid value. Thus, the validity of the time-dependent data used for the distributed control can be evaluated with high reliability, and thus the adequacy of the distributed control can be ensured.

Second Embodiment

Figure 9:
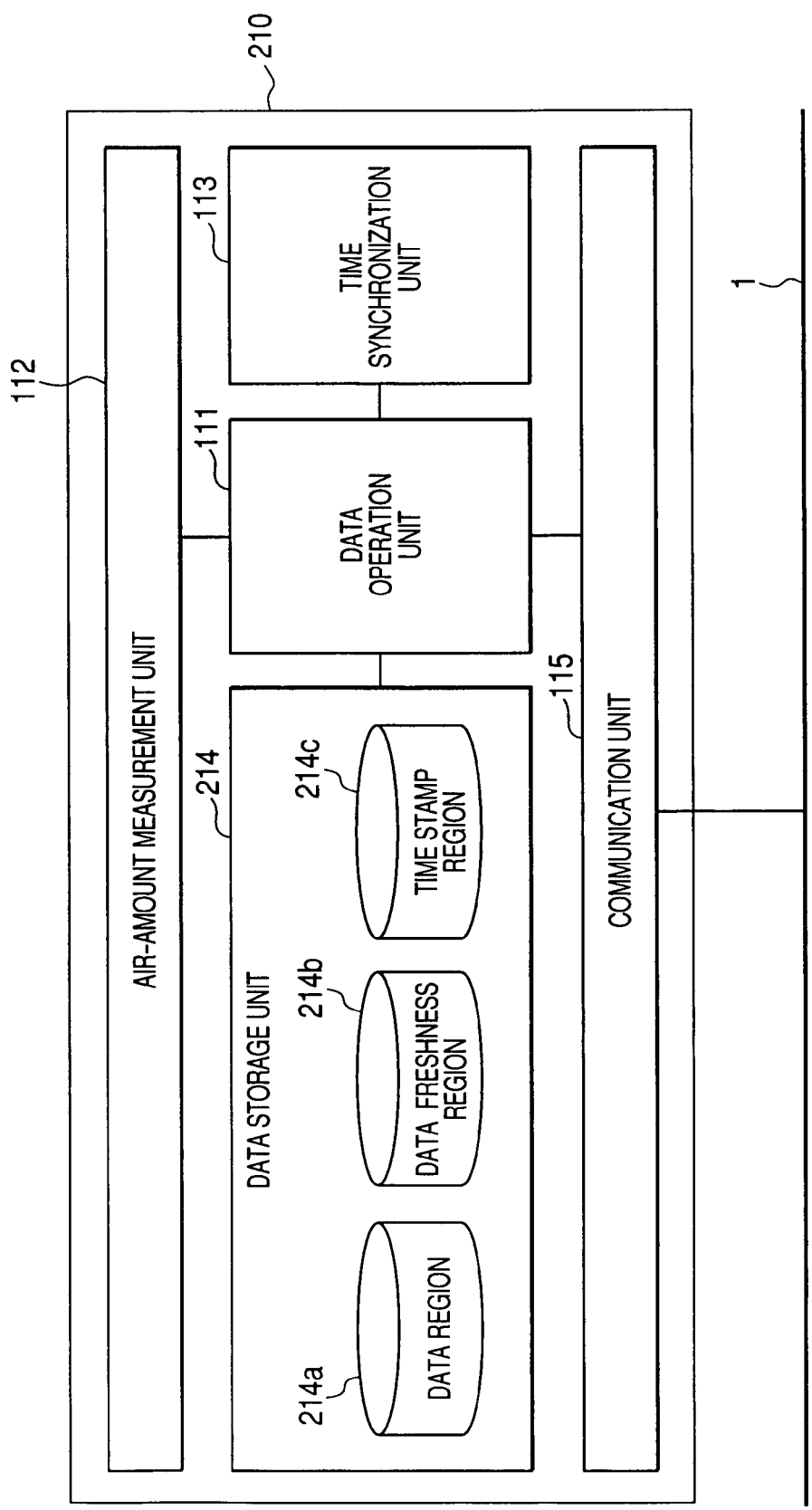
FIG. 9 is a block diagram illustrating an inner structure of an electronic control unit used for a vehicle control system according to a second embodiment of the present invention.
Figure 10:
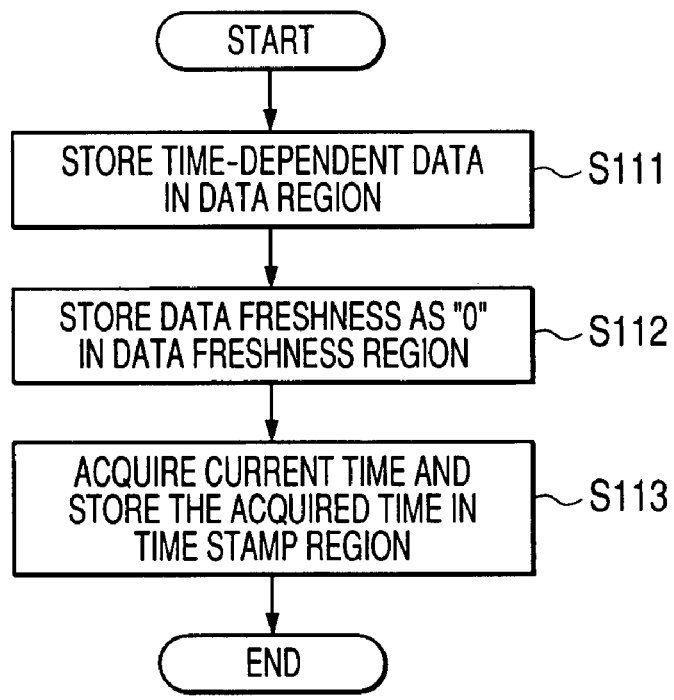
FIG. 10 is a flow diagram illustrating a procedure of control which is performed by a data operation unit when an amount of intake air has been newly found by an air amount measurement unit in a throttle valve control device, according to the second embodiment.
Figure 11:
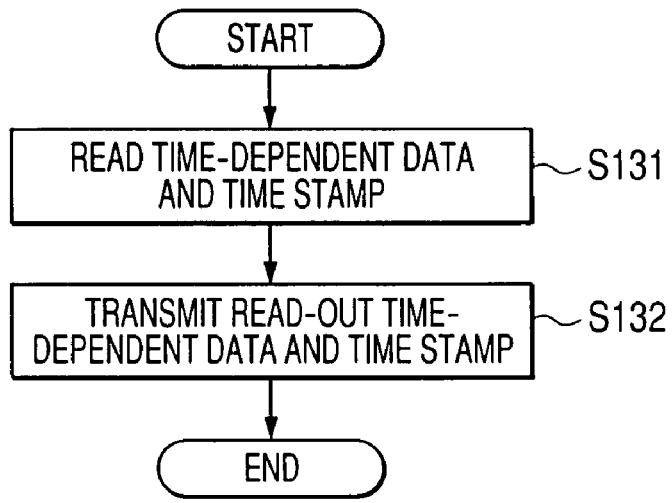
FIG. 11 is a flow diagram illustrating a procedure of control which is performed by the data operation unit in a throttle valve control device when transmitting data indicative of freshness, according to the second embodiment.

With reference to FIGS. 9 to 11, hereinafter is described a vehicle control system and electronic control units used for the system, according to a second embodiment of the present invention. In the second embodiment, the identical or similar components to those in the first embodiment are given the same references for the sake of simplification or omission of explanation.

The vehicle control system of the present embodiment is substantially the same as the vehicle control system (see FIG. 1) of the first embodiment. In particular, the present embodiment also employs a time-synchronization network system to perform so-called real-time control through a plurality of electronic control units on an in-vehicle network. Thus, the in-vehicle network 1 in the system of the present embodiment includes a plurality of electronic control units 100. Also, similar to the first embodiment, the vehicle control system of the present embodiment performs the following processes:

The time-dependent data is subjected to transmission/reception between the plurality of electronic control units 100, and various in-vehicle devices (e.g., throttle valve and injector) are subjected to distributed control based on the commonly possessed time-dependent data in a synchronized manner.

The freshness indicative data for the time-dependent data is also subjected to transmission/reception between the plurality of electronic control units 100, and in performing the distributed control, the validity of the time-dependent data is determined based on the freshness indicative data.

In the present embodiment, however, the transmission-side electronic control unit 100 performs as follows. In particular, upon receipt of a demand for registering time-dependent data, the data operation unit 111 registers time data indicative of the time of the demand. In transmitting freshness indicative data, the data operation unit 111 uses this registered time data as freshness indicative data. Thus, the registered time data is adapted to be transmitted to other electronic control units through the in-vehicle network.

FIG. 9 is a block diagram functionally illustrating an inner structure of the transmission-side electronic control unit, according to the present embodiment. In the present embodiment as well, for the sake of clarity, indication related to the distributed control is omitted from the figure in order to focus explanation on various operations associated with the freshness indicative data and administration of the freshness indicative data. In the present embodiment, a throttle valve control device 210 is intended to play a roll of the transmission-side electronic control unit 100 in transmitting the time-dependent data and the freshness indicative data of the time-dependent data.

As shown in FIG. 9, the throttle valve control device 210 of the present embodiment is also dominantly made up of the data operation unit 111 for operating and administering the time-dependent data and the freshness indicative data of the time-independent data, which are used for the distributed control. Similar to the first embodiment, the data operation unit 111 transmits/receives these data to/from the air-amount measurement unit 112, the time synchronization unit 113, a data storage unit (memory means) 214 and the communication unit 115, for example. Among them, the data storage unit 214 of the present embodiment has the following three storage data regions 214a, 214b and 214c:

Data region 214a in which the intake amount as the time-dependent data is stored;

Data region 214b in which the data freshness that is the time passed from the point of acquiring the intake amount is stored; and Data region 214c in which the time data (time stamp) indicative of the time of acquiring the intake amount is stored.

FIG. 10 is a flow diagram illustrating a procedure of control performed by the data operation unit 111 of the throttle valve control device 210 according to the present embodiment, when there is a demand for registering measured intake amount at the data storage unit 214.

Specifically, assume that the intake amount has been newly measured by the air-amount measurement unit 112, and that the data operation unit 111 has been demanded to register the measured intake amount at the data storage unit 214. As shown in FIG. 10, the data operation unit 111 firstly stores (step S111) the demanded intake amount (time-dependent data) in the data region 214*a* of the data storage unit 214. Then, after registering the intake amount (time-dependent data) at the data storage unit 214, the data freshness of the intake amount is stored in the data freshness region 214*b* of the data storage unit 214 in order to count time from the point of the registration (step S112). At the same time, the current time is obtained from the time synchronization unit 113 for storage in the time stamp region 214*c* in the data storage unit 214 (step S113). In the present embodiment as well, the value of the data freshness is stored in the data freshness region 214*b* as "0". Thereafter, the value is periodically renewed by the data operation unit 111 (see FIG. 6).

In this way, in the present embodiment, the time displayed by the time synchronization unit 113 is stored in the time stamp region 214*c* when the intake amount is registered in the data storage unit 214 (or when the intake amount is acquired). Accordingly, the time stored in the time stamp region 214*c* can be read out (step S131) for transmission as the time data (time stamp) (step S132). Thus, the process for obtaining the time data (time stamp) is more simplified, and thus a smooth process can be expected in the communication of the time data.

On the other hand, the reception-side electronic control unit 100 can perform a reception process in a manner similar to the first embodiment (see FIG. 8), i.e. based on the received intake amount and time data (time stamp).

As described above, basically the same effects (1), (2) and (5) to (8) as in the first embodiment, or effects similar thereto can be obtained by the vehicle control system and electronic control units used for the system according to the present embodiment. At the same time, the following additional effect can be obtained.

(9) At the time of registering the intake amount in the data storage unit 214 (or at the time acquiring the intake amount), the time displayed by the time synchronization unit 113 is stored in the time stamp region 214*c*. Then, the time stored in the time stamp region 214*c* is read out for transmission as the time data (time stamp). Thus, a smooth process can be expected in the communication of the time data.

Other Embodiments

The above embodiments may be modified as follows.
In the above embodiments, the control devices 110, 120 and 210 have been intended to extensively perform driving control of in-vehicle devices, such as control of opening degree of a throttle valve or control of fuel injection amount of an injector. However, such driving control of the in-vehicle device may be separately performed by other electronic control units 100 on the in-vehicle network 1.
In the second embodiment, the current time has been obtained from the time synchronization unit 113 for storage in the time stamp region 214*c* of the data storage unit 214. In performing this process, it is desirable to make a determination as to the correctness of the current time displayed by the time synchronization unit 113. Therefore, in case the current time is incorrect, an invalid value may be labeled on the time indicated by the time data to allow the reception-side electronic control unit 100 to recognize the incorrectness of the time of synchronization on the transmission-side device and then to take suitable measure based on the recognition.
Suitable control according to a result of determination on the validity of the time-dependent data may only be a control which can maintain the adequacy of the distributed control. For example, if an invalid value is labeled on the counted value of the data freshness, that is, if the freshness of the time-dependent data is low and thus is determined as having already lost its validity as a data to be used for the distributed control, the following modes, for example, may be employed:
(a) Mode for inhibiting or stopping control based on the time-dependent data in question.
(b) Mode for correcting the time-dependent data in question to effect control based on the corrected data.
Any means may be employed for realizing the time-synchronization network system.
The reception-side electronic control unit 100 may receive the data indicative of the time of acquisition of the time-dependent data at the time when it is acquired by the transmission-side electronic control unit 100, so that the reception-side electronic control unit 100 can count time from the point of acquiring the time-dependent data on the basis of the received data.
The processes (at steps S24 to S26) for making a determination on whether or not an invalid value should be labeled on the data freshness and for performing control based on the determination may be performed as a control separate from the renewal control (FIG. 6) of the data freshness.
The process for determining whether or not an invalid value should be labeled on the data freshness may be performed either one of steps S25*a* and S25*b*.
When the counted value of the data freshness is invalid, data indicative of the invalidity (invalid data) may be registered separate from the freshness data, instead of labeling an invalid value on the data freshness.
When determining the validity of the time-dependent data, the counted value of the data freshness may be determined as to its invalidity (step S25*a* and step S25*b*), so that the validity of the time-dependent data can be determined based on the determination.
The above effect (1) would be achieved by any vehicle control system which counts time from the point of acquiring the time-dependent data, and determines the validity of the time-dependent data based on the counted time (data freshness), or by any electronic control unit used in such a vehicle control system. Accordingly, in achieving the effect (1), the time data indicative of the time of acquisition of the time-dependent data (time stamp) may not necessarily be used as the freshness indicative data of the time-dependent data when making communication on the freshness indicative data. However, in this case, when delay has been caused in the communication by the communication loading of the in-vehicle network 1 or by the loading of the processes of the electronic control units 100, the delay time is not reflected on the data (counted time) subjected to communication. Therefore, in light of this logic, it is more preferable to use the time data (time stamp) as the freshness indicative data in making communication on the freshness indicative data of the time-dependent data.
Any physical amount data that changes with the passage of time, i.e. data that can be imparted with freshness indicative data, can be used as the time-dependent data for use in the distributed control, including, for example, an intake amount or fuel injection amount, temperature, vehicle speed and engine speed.

Any data freshness can be used if only it is obtained by counting time from the point of acquiring the time-dependent data by being periodically renewed. For example, the time from the acquisition of the time-dependent data may be counted down instead of being counted up to derive the data freshness.

In the above embodiments, the acquisition time of the time-dependent data has been dealt as time when the time-dependent data has been stored in the data storage unit in the electronic control unit. However, any time can be basically used as the acquisition time of the time-dependent data. For example, time when the time-dependent data is measured by the air-amount measurement unit may be used as reference time for the acquisition. In principle, the acquisition time may be any time when the time-dependent data is retrieved by any one of the components constituting the electronic control units (e.g., electronic parts such as the data operation unit or the data storage unit).

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An electronic control unit incorporated as one of a plurality of electronic controllers composing a system for controlling in-vehicle devices on a distributed and mutually-synchronized control manner in a vehicle, the plurality of electronic control units being communicably connected with each other via an in-vehicle network so as to communicate information including time-dependent data among the electronic control units, the time-dependent data being acquired in time series relating to the vehicle, the electronic control unit comprising:
    a control member performing the control on the basis of time-dependent data;
    an elapsed-time calculation component configured to calculate an elapsed time elapsing from acquisition of the time-dependent data; and
    a validity determination component configured to use the calculated elapsed time to determine whether or not the time-dependent data is valid or not for the control in terms of freshness of the time-dependent data.

2. The electronic control unit of claim 1, wherein the elapsed-time calculation component is configured to calculate the elapsed time by counting up time at intervals whenever the time-dependent data is acquired.

3. The electronic control unit of claim 1, comprising:
    a production component producing, as information indicative of the freshness of the time-dependent data, data showing a time instant at which the time-dependent data is acquired, and
    a transmission component transmitting both the time-dependent data and the data showing the time instant of the data acquisition to another electronic control unit via the in-vehicle network.

4. The electronic control unit of claim 3, wherein the production component is configured to: obtain a current time instant at which the time-dependent data is transmitted and calculate the data showing the time instant of the data acquisition by subtracting the calculated elapsed time from the current time instant of the transmission.

5. The electronic control unit of claim 4, wherein the validity determination component comprises
    a current-time determination component determining whether or not the current time instant is normal or not when the transmission is carried out; and
    a setting component setting an invalid value to the data showing the time instant of the data acquisition if it is determined that the current time instant is not normal.

6. The electronic control unit of claim 4, comprising:
    a memory device in which the time-dependent data are memorized together with the data showing the time instant at which the time-dependent data is acquired,
    wherein the setting component is configured to make reference to the memory device to obtain the time instant of the data acquisition.

7. The electronic control unit of claim 3, wherein the validity determination component is configured to:
    determine whether or not the calculated elapsed time shows an invalidity thereof,
    determine that the time-dependent data is invalid for the control whenever it is determined that the calculated elapsed time shows the invalidity thereof, and
    set an invalid value to the calculated elapsed time.

8. The electronic control unit of claim 7, wherein the validity determination component is configured to record the data showing the invalidity when the calculated elapsed time exceeds a limit time thereof which corresponds to a maximum expression of the information indicative of the freshness of the time-dependent data.

9. The electronic control unit of claim 7, wherein the validity determination component is configured to record the data showing the invalidity when the calculated elapsed time passes over a valid term which is set guarantee the validity of the time-dependent data.

10. The electronic control unit of claim 7, wherein the validity determination component is configured to:
    determine whether or not there is set a valid term to the calculated elapsed time;
    determine whether or not the calculated elapsed time exceeds a limit time thereof which corresponds to a maximum expression of the information indicative of the freshness of the time-dependent data, when it is determined that the valid term is not set;
    record the data showing the invalidity whenever the calculated elapsed time exceeds the limit time;
    determine whether or not the calculated elapsed time passes over the valid term, when it is determined that the valid term is set; and
    record the data showing the invalidity whenever the calculated elapsed time passes over the valid term.

11. The electronic control unit of claim 3, comprising:
    a reception component receiving both the time-dependent data and the data showing the time instant of the data acquisition from another electronic control unit via the in-vehicle network; and
    a further elapsed-time calculation component is configured to calculate an elapsed time elapsing from acquisition of the received time-dependent data on the basis of both the data showing the time instant of the data acquisition and a current time instant at which the time-dependent data is received by the reception component, the calculated elapsed time being provided to the validity determination component.

12. The electronic control unit of claim 11, wherein the further elapsed-time calculation component is configured to:

obtain the current time instant at which the time-dependent data is received and calculate the elapsed time elapsing from the acquisition of the received time-dependent data by subtracting the time instant of the acquisition of the received time-dependent data from the current time instant of the reception.

13. The electronic control unit of claim 12, wherein the validity determination component is configured to:

determine whether or not the calculated elapsed time shows an invalidity thereof, determine that the time-dependent data is invalid for the control whenever it is determined that the calculated elapsed time shows the invalidity thereof, set an invalid value to the calculated elapsed time.

14. The electronic control unit of claim 13, wherein the validity determination component is configured to: record the data showing the invalidity when the calculated elapsed time exceeds a limit time thereof which corresponds to a maximum expression of the information indicative of the freshness of the time-dependent data.

15. The electronic control unit of claim 13, wherein the validity determination component is configured to record the data showing the invalidity when the calculated elapsed time passes over a valid term which is set guarantee the validity of the time-dependent data.

16. The electronic control unit of claim 13, wherein the validity determination component is configured to:

determine whether or not there is set a valid term to the calculated elapsed time;

determine whether or not the calculated elapsed time exceeds a limit time thereof which corresponds to a maximum expression of the information indicative of the freshness of the time-dependent data, when it is determined that the valid term is not set;

record the data showing the invalidity whenever the calculated elapsed time exceeds the limit time;

determine whether or not the calculated elapsed time passes over the valid term, when it is determined that the valid term is set; and record the data showing the invalidity whenever the calculated elapsed time passes over the valid term.

17. The electronic control unit of claim 12, wherein the validity determination component is configured to determine whether or not the current time instant is normal or not when the reception is carried out;

determine whether or not the received data showing the time instant of the data acquisition shows validity thereof; and set an invalid value to the calculated elapsed time if it is determined that the current time instant is not normal and/or the time instant of the data acquisition does not validity thereof.

18. A system for controlling in-vehicle devices on a distributed and mutually-synchronized control manner in a vehicle, the system comprising:

a plurality of electronic control units which are in charge of controlling operations of the in-vehicle devices on the basis of time-dependent data acquired in time series relating to the vehicle; and an in-vehicle network communicably connecting the electronic control units with each other so as to communicate information including the time-dependent data among the electronic control units, wherein each of the electronic control units comprises an elapsed-time calculation component configured to calculate an elapsed time elapsing from acquisition of the time-dependent data; and a validity determination component configured to use the calculated elapsed time to determine whether or not the time-dependent data is valid or not for the control in terms of freshness of the time-dependent data.

19. The electronic control unit of claim 18, wherein the elapsed-time calculation component is configured to calculate the elapsed time by counting up time at intervals whenever the time-dependent data is acquired.

20. The system of claim 19, wherein each of the electronic control units comprises a production component producing, as information indicative of the freshness of the time-dependent data, data showing a time instant at which the time-dependent data is acquired, and a transmission component transmitting both the time-dependent data and the data showing the time instant of the data acquisition to another electronic control unit via the in-vehicle network.

21. The system of claim 20, wherein the production component is configured to obtain a current time instant at which the time-dependent data is transmitted and calculate the data showing the time instant of the data acquisition by subtracting the calculated elapsed time from the current time instant of the transmission.

22. The system of claim 21, wherein the validity determination component comprises a current-time determination component determining whether or not the current time instant is normal or not when the transmission is carried out; and a setting component setting an invalid value to the data showing the time instant of the data acquisition if it is determined that the current time instant is not normal.

23. The system of claim 20, wherein each of the electronic control units comprises a reception component receiving both the time-dependent data and the data showing the time instant of the data acquisition from another electronic control unit via the in-vehicle network; and a further elapsed-time calculation component is configured to calculate an elapsed time elapsing from acquisition of the received time-dependent data on the basis of both the data showing the time instant of the data acquisition and a current time instant at which the time-dependent data is received by the reception component, the calculated elapsed time being provided to the validity determination component.

24. The system of claim 23, wherein the further elapsed-time calculation component is configured to:

obtain the current time instant at which the time-dependent data is received and calculate the elapsed time elapsing from the acquisition of the received time-dependent data by subtracting the time instant of the acquisition of the received time-dependent data from the current time instant of the reception.

25. The system of claim 24, wherein the validity determination component includes determine whether or not the current time instant is normal or not when the reception is carried out;

determine whether or not the received data showing the time instant of the data acquisition shows validity thereof; and set an invalid value to the calculated elapsed time if it is determined that the current time instant is not normal and/or the time instant of the data acquisition does not validity thereof.

* * * * *